(12) United States Patent
Yokoi et al.

(10) Patent No.: US 8,108,859 B2
(45) Date of Patent: Jan. 31, 2012

(54) PROCESSOR FOR CONTROLLING TREAD SWITCHING

(75) Inventors: Megumi Yokoi, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1814 days.

(21) Appl. No.: 10/967,235

(22) Filed: Oct. 19, 2004

(65) Prior Publication Data

US 2005/0240752 A1    Oct. 27, 2005

(30) Foreign Application Priority Data

Apr. 21, 2004  (JP) .................................. 2004-125763

(51) Int. Cl.
*G06F 9/46* (2006.01)
*G06F 9/44* (2006.01)
*G06F 13/00* (2006.01)

(52) U.S. Cl. ........ 718/100; 718/102; 718/103; 718/108; 712/207; 712/233; 711/125

(58) Field of Classification Search .................. 718/102, 718/103, 104, 108, 100
See application file for complete search history.

(56) References Cited

U.S. PATENT DOCUMENTS

| | | | | |
|---|---|---|---|---|
| 5,361,337 | A * | 11/1994 | Okin .............................. | 712/228 |
| 5,974,522 | A * | 10/1999 | Torng et al. ..................... | 712/23 |
| 6,148,394 | A * | 11/2000 | Tung et al. ..................... | 712/218 |
| 6,212,544 | B1 | 4/2001 | Borkenhagen et al. | |
| 6,532,534 | B1 * | 3/2003 | Sunayama et al. ............ | 712/240 |
| 6,567,839 | B1 | 5/2003 | Borkenhagen et al. | |
| 6,571,329 | B1 * | 5/2003 | Ukai et al. ..................... | 712/205 |
| 6,694,425 | B1 | 2/2004 | Eickemeyer | |
| 6,851,043 | B1 * | 2/2005 | Inoue ............................. | 712/217 |
| 2001/0004756 | A1 * | 6/2001 | Inoue ............................. | 712/217 |
| 2004/0006685 | A1 * | 1/2004 | Yoshida ........................ | 712/218 |
| 2005/0177666 | A1 * | 8/2005 | Kimelman et al. ........... | 710/200 |

FOREIGN PATENT DOCUMENTS

| | | |
|---|---|---|
| JP | 3-71248 | 3/1991 |
| JP | 11-96005 | 4/1999 |
| JP | 2001-521215 | 11/2001 |
| JP | 2001-521216 | 11/2001 |
| JP | 2001-521219 | 11/2001 |
| JP | 2001521215 | * 11/2001 |
| JP | 2001521216 | * 11/2001 |
| JP | 2001521219 | * 11/2001 |
| JP | 2001-356903 | 12/2001 |
| JP | 2001356903 | * 12/2001 |

OTHER PUBLICATIONS

Japanese Decision of Rejection issued Mar. 17, 2009 in corresponding Japanese Patent Application 2004-125763.
Front Page of International Patent Application Publication No. 99/21081, Apr. 29, 1999.

(Continued)

*Primary Examiner* — Meng An
*Assistant Examiner* — Caroline H Arcos
(74) *Attorney, Agent, or Firm* — Staas & Halsey LLP

(57) ABSTRACT

The multi-threading changeover control apparatus of the present invention changes over threads in an information processing device in which a multi-threading method is used, and comprises a thread changeover request unit outputting a thread changeover request signal after a cache miss occurs in which an instruction to be fetched is not stored when the instruction is fetched or a thread execution priority order change request unit outputting a thread execution priority order change request signal.

10 Claims, 21 Drawing Sheets

OTHER PUBLICATIONS

Abstract of European Patent No. 1029269, Aug. 23, 2000.
Hisashige Ando et al., "SPARC64 V Microprocessor designed to achieve High Reliability", Technical Report of IEICE (National Academic Conference Paper 2005-00082-019), The Institute of Electronics, Information and Communication Engineers, vol. 2003, No. 105, Oct. 24, 2003, pp. 127-132.
Japanese of Action mailed Dec. 9, 2008 and issued in corresponding Japanese Patent Application 2004-125763.

* cited by examiner

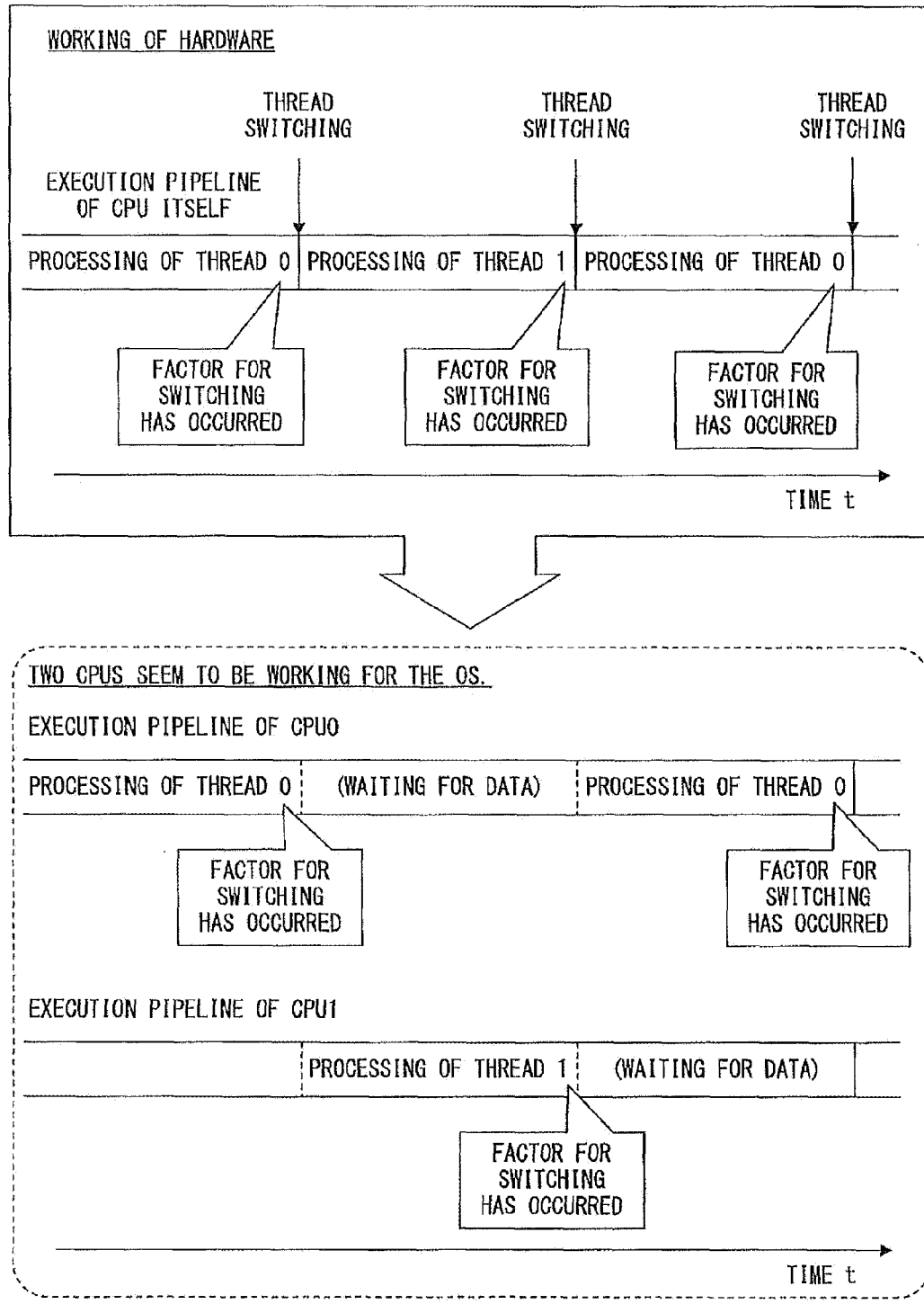
F I G. 1

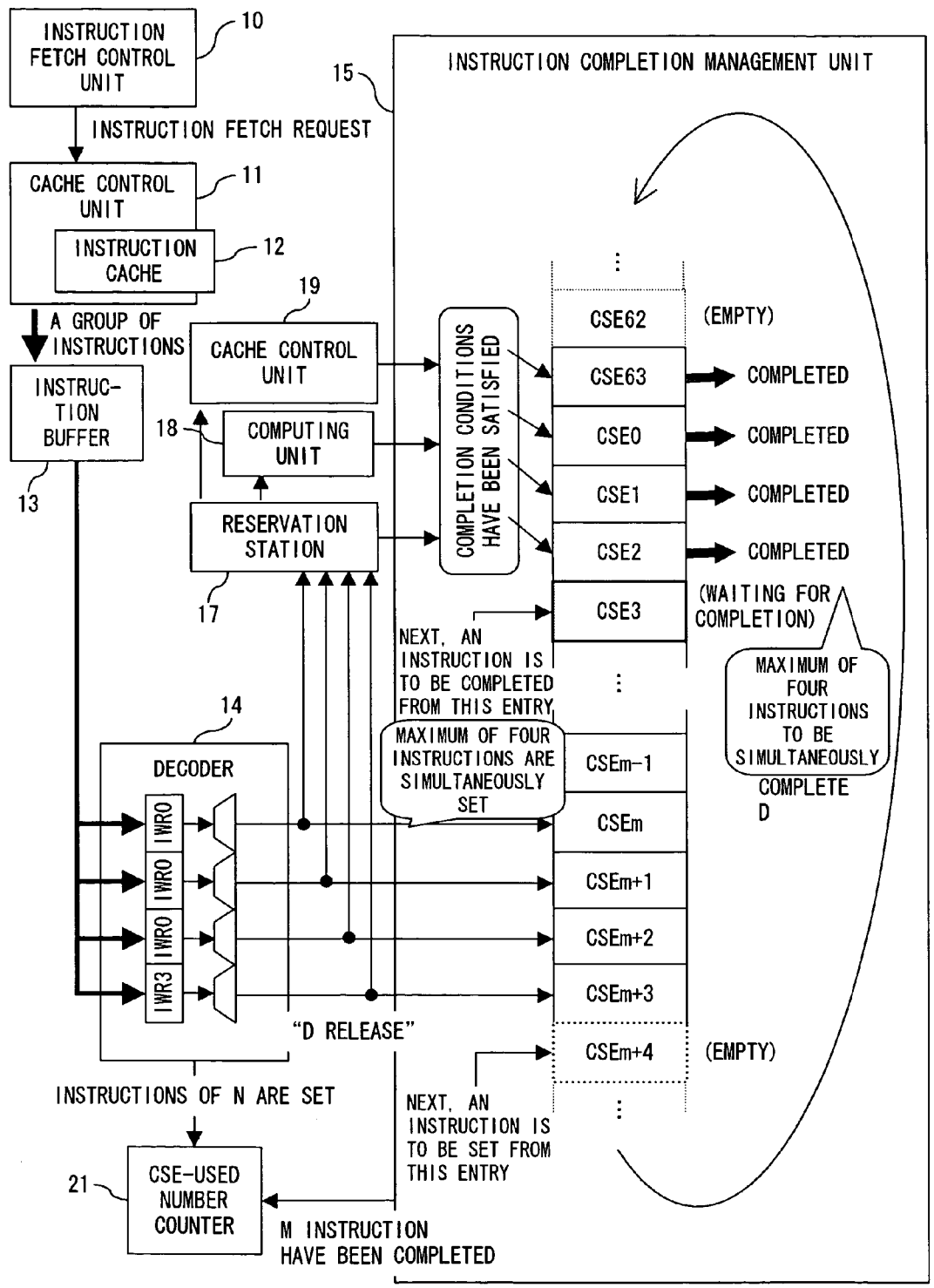
F I G. 3

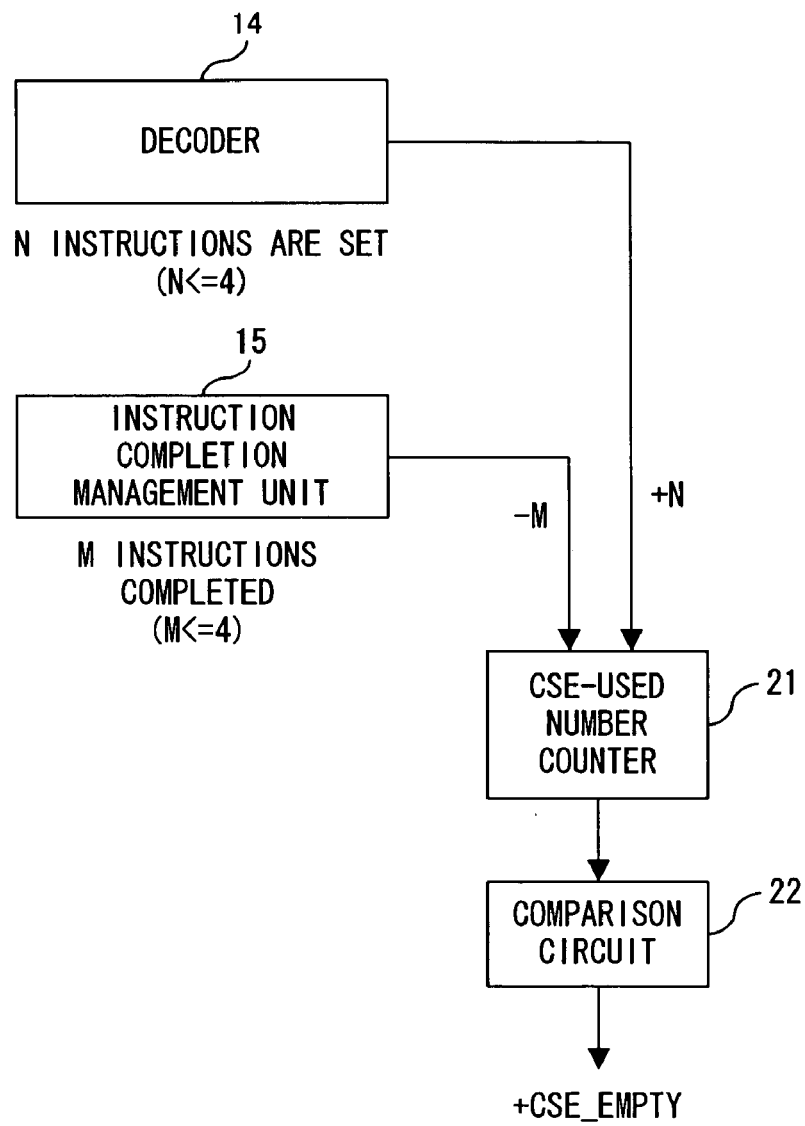
F I G. 5

+IF_TOQ_MISS_DETECTED

+USED_CSE_EQ_1

+RSBR0_VALID

+THREAD_SWITCH_REQUEST

F I G. 1 3

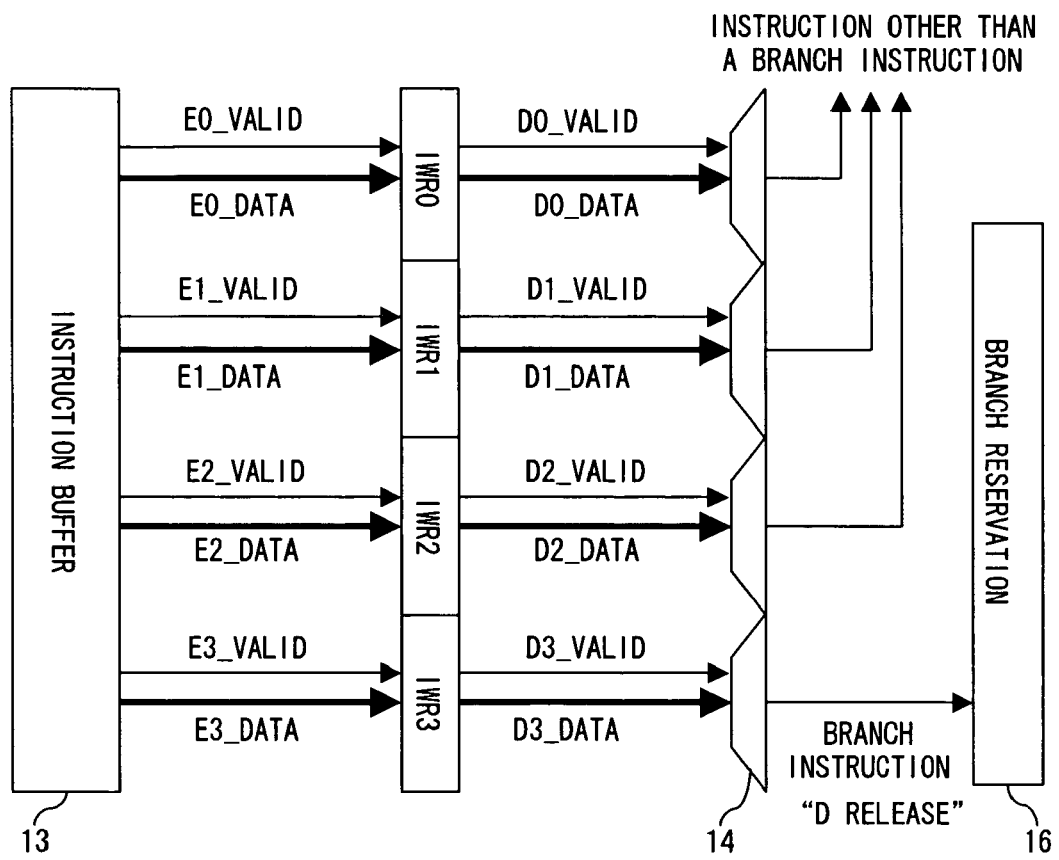
F I G. 1 4

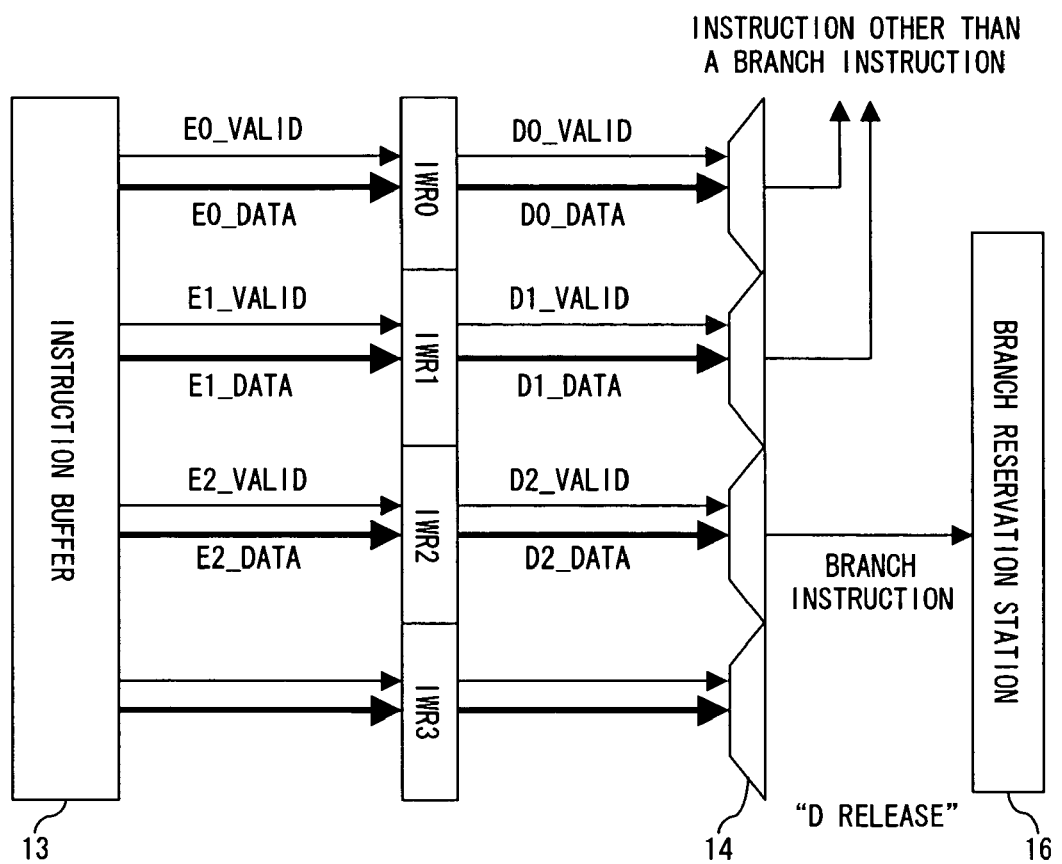
F I G. 1 6

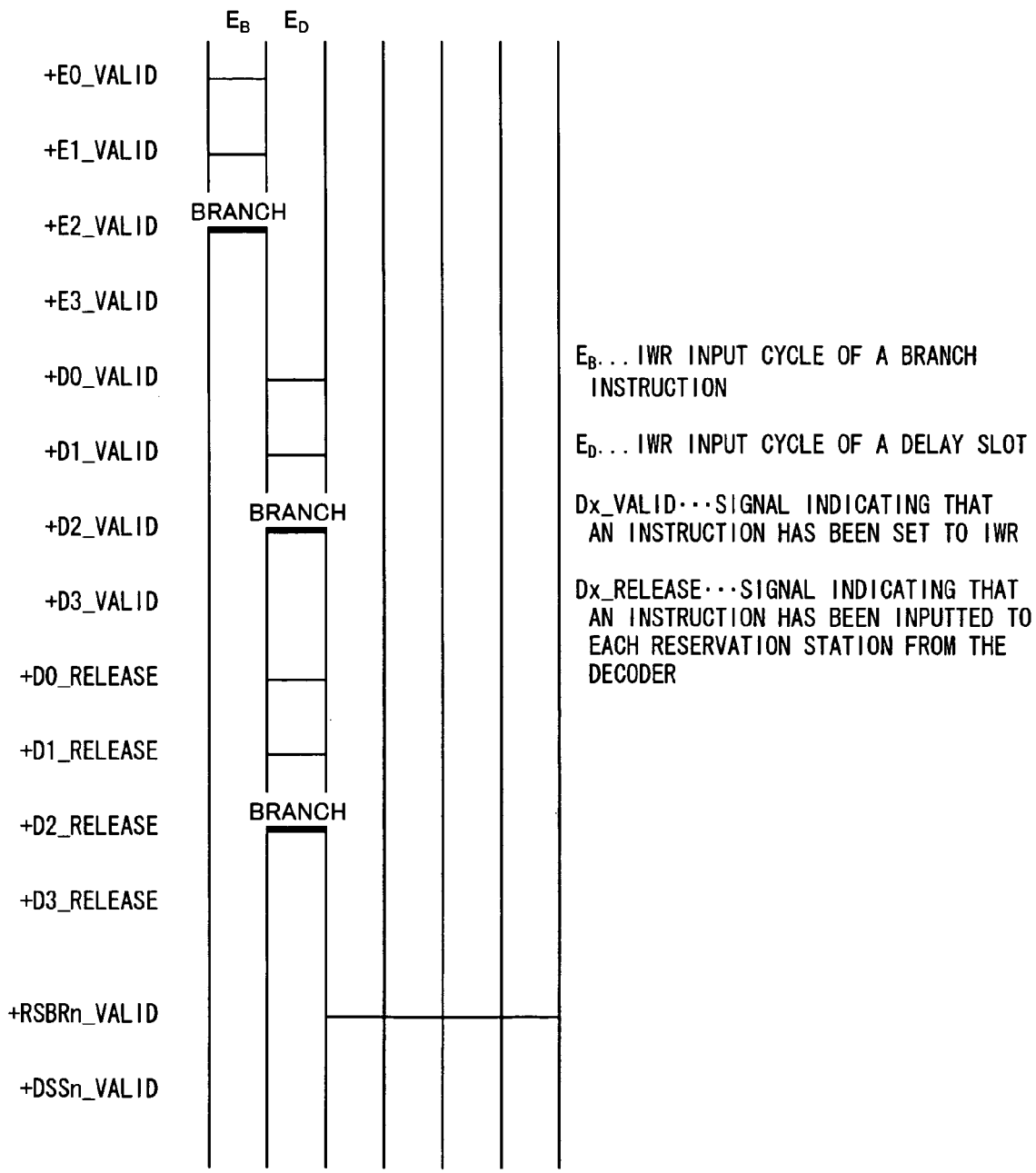
F I G. 1 7

+IF_TOQ_MISS_DETECTED (BE CAREFUL ABOUT
THE POLARITY)
−EO_VALID (BE CAREFUL ABOUT
THE POLARITY)
−DO_VALID

+RSBR0_VALID

−RSBR1_VALID

+DSS0_VALID

+THREAD_SWITCH_REQUEST

FIG. 19

PROCESSOR FOR CONTROLLING TREAD SWITCHING

BACKGROUND OF THE INVENTION

1. Field of the Invention

The present invention relates to the method of processing the execution of instructions in an information processing device and more specifically, to the method of changing over threads or the method of changing the priority order of executing threading in an information processing device using a hardware multi-threading method.

2. Description of the Related Art

There is a multi-threading method as one of the methods for using the resources of a calculator as much as possible. The multi-threading method is the method which produces such an effect using one processor that as if a plurality of processors were processing. Thread stands for the processing of one processor among a plurality of logical processors. One of the multi-threading methods is a vertical multi-threading (VMT) method. When any factor for changing over a thread arises, this method changes over the thread and makes a computing unit perform any other irrelevant processing without leaving the computing unit idle.

FIG. 1 is an explanatory drawing of the operation of a conventional VMT method. In this method, the processing of a thread which actually flows through a execution pipeline at a specific time is one, and the processing is the multi-threading processing in which time is vertically divided, but it seems to the OS that two CPUs are working. In order to efficiently execute multi-treading processing, it is important under what condition the thread should be changed over.

Another multi-threading method is a simultaneous multi-threading method (SMT). This method is the multi-threading method in which a plurality of thread instruction strings are inputted alternately or simultaneously to one or more pipelines, and processing is executed by sharing the computing unit, and there can exist a plurality of threads which are processed at a specific time. In the SMT method, when a thread switching condition in which a thread stops operating occurs, it is possible to efficiently use the resources of the calculator by executing the processing of other threads on a preferential basis. In the SMT method, a plurality of address calculators and computing units can be used as occasion arises.

There are the following documents concerning the conventional art using the multi-threading method.

Patent document 1: Kokai (Jpn, unexamined patent publication) No. 11-96005 "Parallel Processing Equipment"

Patent document 2: Kokai (Jpn, unexamined patent publication) No. 2001-521215 "Method and Apparatus for Selecting Thread Switching Events by a Multi-Threading Type Processor"

Patent document 3: Kokai (Jpn, unexamined patent publication) No. 2001-521219 "Change of Thread Priority Order by a Multi-Threading Type Processor"

Disclosed in patent document 1 is the art in which a standing-by thread execution unit is used to realize the speedup of processing by executing the instructions of both the condition fulfilled side and the condition unfulfilled side of the condition branch instructions and selecting either of them after the condition fulfillment or condition unfulfillment is established.

Disclosed in patent documents 2 and 3 is the system which can change the thread priority order in the thread switching logic including a thread switching control register for storing thread switching conditions or can select a thread switching event.

Important as one of thread switching conditions is memory access by a cache miss. A very long time is required for such memory access, and the penalty of a cache miss in a high-speed processor is very huge. A state in which a computing unit, etc. in the processor are not used continues for a long time, and in order to effectively use the waiting time, it is necessary to switch a thread.

However, there also exists a cache miss occurring on the side of operand among cache misses, so it is necessary to correctly distinguish a miss of instruction cache and a miss of operand cache. Moreover, when a cache miss occurs, for example, in accordance with a branch instruction, the instruction string in the memory access is not actually used owing to the miss in branch prediction, etc., and correct processing is executed promptly in the same thread, so that in such a case, it is unnecessary to switch the thread, and when a miss of instruction cache occurs, it is necessary to clarify the condition for changing over the thread.

In patent documents 1 to 3, the method and condition for the switching of the thread which should be implemented by, for example, taking advantage of the opportunity of a miss of instruction cache occurring are not clarified, and the problem in that the condition for changing over the thread must be clarified is not solved.

SUMMARY OF THE INVENTION

In view of the above problem, the purpose of the present invention is to provide the method of changing over a thread taking advantage of an opportunity of a cache miss occurring when an instruction is fetched and to improve the performance of the multi-threading method by clarifying the condition for changing over the thread when a cache miss occurs in response to a branch instruction etc.

The multi-threading switching control apparatus of the present invention changes over threads in an information processing device in which a multi-threading method is used, and comprises a thread switching request unit outputting a thread switching request signal after a cache miss occurs in which an instruction to be fetched is not stored when the instruction is fetched or a thread priority order change request unit outputting a thread execution priority order change request signal.

BRIEF DESCRIPTION OF THE DRAWINGS

FIG. 1 shows the operation of a conventional multi-threading method.

FIG. 3 shows the operation of the instruction completion management unit shown in FIG. 2B.

FIG. 5 shows the method of detecting an empty state of a commit stack entry.

FIG. 13 is a time chart showing the production of a thread switching request signal shown in FIG. 12.

FIG. 14 shows the operation of supplying a branch instruction from the instruction buffer via the instruction word register.

FIG. 16 shows the operation of supplying a instruction data from the instruction buffer via the instruction word register in a third embodiment.

FIG. 17 is a time chart showing the supply of instruction data shown in FIG. 16.

FIG. 19 is a time chart showing the production of a thread switching request signal shown in FIG. 18.

DESCRIPTION OF THE PREFERRED EMBODIMENTS

Described below are the details of the preferred embodiments of the present invention with reference to the accompanying drawings.

Figure 2A:
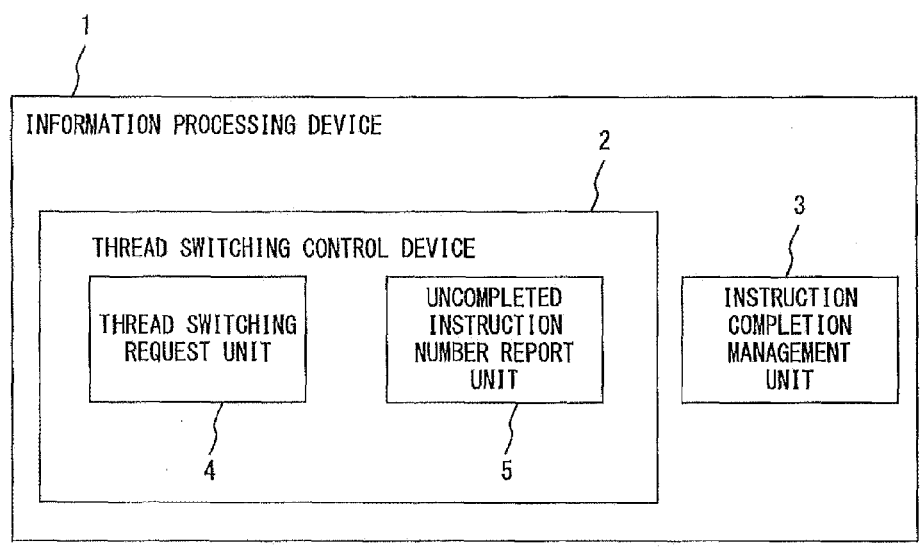
FIG. 2A is a block diagram of the configuration showing the principle of the information processing device using the thread switching control method of the present invention.

FIG. 2A is a block diagram of the configuration showing the principle of the information processing device using the thread switching control method of the present invention. In the same figure, an information processing device 1 has a thread switching control device 2 inside of the information processing device, and a thread switching control device 2 includes at least a thread switching request output unit 4 for example, a switching request production circuit which outputs a thread switching request signal after a cache miss occurs in which an instruction to be fetched in the cache is not stored when the instruction is fetched.

In the embodiment of the present invention, the information processing device 1 includes an instruction completion management unit 3 in which the entry in which data related to the execution of the instruction is stored is made in response to the instruction which has already been decoded in 1 to 1, and the entry is deleted when the execution of the instruction is completed.

the thread switching control apparatus 2 further comprises an uncompleted instruction number report unit 5, for example, a CSE-used number counter and a comparison circuit, which reports the number of uncompleted instructions to the thread switching request unit 4 based on the number of entries which have not been deleted among the entries which have been made, and the thread switching request device 4 output a thread switching request signal when the thread switching request unit 4 receives a report indicating that the number of is 0 after the cache miss occurs. Thus, the execution of all the instructions prior to the instruction which has given rise to the cache miss completes, and at the point of time when it is made sure to use the instruction which has given rise to the cache miss, a thread switching request signal is outputted.

In an embodiment of the present invention, the information processing device 1 further comprises the instruction completion management unit 3 and an a branch reservation station in which when the branch instruction is decoded, the entry in which data related to the execution of the branch instruction is stored in the order of the decoding is made successively from the top, and when the branch instruction is completed, the contents stored in the entry are deleted, and the contents stored in the entries which correspond to the uncompleted branch instruction are successively moved toward the top entry, and the thread switching control device 2 further comprises an uncompleted instruction number report unit 5, and when the thread switching request unit 4 receives a report indicating that the number of uncompleted instructions is 1 after the cache miss occurs from the uncompleted instruction number report unit 5, and can when receiving a signal indicating that valid data is stored in the top entry from the branch reservation station, output the thread switching request signal.

In an embodiment, the information processing device 1 comprises the instruction completion management unit 3, a branch reservation station in which when the branch instruction is decoded, the entry in which data related to the execution of the branch instruction is stored in the order of the decoding is made successively from the top, and when the branch instruction is completed, the contents stored in the entry are deleted, and the contents stored in the entries which correspond to the uncompleted branch instructions are successively moved toward the top entry, a branch reservation station which has a delay slot stack which stores the delay instruction in response to the entry in which data related to the execution of the corresponding branch instruction is stored when the delay instruction corresponding to the branch instruction exists immediately after the branch instruction, and a plurality of instruction word registers which, when a plurality of instructions are simultaneously supplied from the instruction buffer which temporarily stores one or more fetched instructions, stores the instructions one by one and outputs a valid signal indicating that the stored data is valid. The thread switching request unit 4 can output a thread switching request signal when the device 4 receives a signal indicating that the data of only the top entry is valid and that the data of the delay slot stack corresponding to the top entry is invalid from the branch reservation station after a cache miss occurs, a signal indicating that the data to be outputted is invalid from the instruction word register in which the earliest instruction in the order of execution should be stored in a plurality of instruction word registers, and a signal indicating that the data to be supplied to the register is invalid from the instruction buffer.

In an embodiment, it is possible to compromise a thread switching request suppressing unit which is started when a cache miss occurs and which make to stop the output of any request signal when the thread switching request unit 4 does not output a request signal within a specific time determined in advance.

The information processing device using the thread switching control method of the present invention further comprises a thread priority order change request unit which outputs the change request of a thread execution priority order after a cache miss occurs in which the instruction to be fetched is not stored in the cache when the instruction is fetched, for example, a thread switching control device having a switching request production circuit.

In the embodiment, the information processing device 1 further comprises the instruction completion management unit 3, and the thread switching control device 2 further comprises the uncompleted instruction number report unit 5 in the same way as described above, and the thread priority order change request unit can output a priority order change request signal when it receives a report indicating that the number of uncompleted instructions is 0.

In the embodiment, the information processing device 1 further comprises the instruction completion management unit 3 and the branch reservation station, and the thread switching control device 2 further comprises the uncompleted instruction number report unit 5 in the same way as described above, and the thread priority order change request unit can output a priority order change request signal when the thread switching control device 2 receives a report indicating that the number of uncompleted instructions is 1, and a signal indicating that valid data is stored in the top entry of the branch reservation station.

In the embodiment, the information processing device 1 further comprises the instruction completion management unit 3, the branch reservation station having a delay slot stack, and a plurality of instruction word registers; the information processing device 1 can output a priority order change request signal when the device 1 receives a signal indicating that the data of only the top entry of the branch reservation station is valid and that the data of the delay slot stack corresponding to the top entry is invalid, and receives a signal indicating that the data to be outputted from the instruction word register in which the earliest instruction in the order of execution should be stored is invalid; and receives a signal indicating that the data to be supplied to the instruction word register from the instruction buffer is invalid.

In the embodiment of the present invention, as a method of controlling the switching of a thread, it is possible to use the method of outputting a thread switching request signal after a cache miss occurs in which the instruction to be fetched to the cache is not stored when the instruction is fetched.

According to the present invention, it is possible to switch the thread at the point of time when it is detected that the instruction which gives rise to a cache miss is surely used, for example, by detecting that all the instructions having an earlier execution order than the instruction which gives rise to a cache miss have been executed and by changing the thread switching or the thread execution priority order, taking advantage of the opportunity of a cache miss occurring when an instruction is fetched, thus greatly contributing to improvement in the performance of the multi-threading method.

Figure 2B:
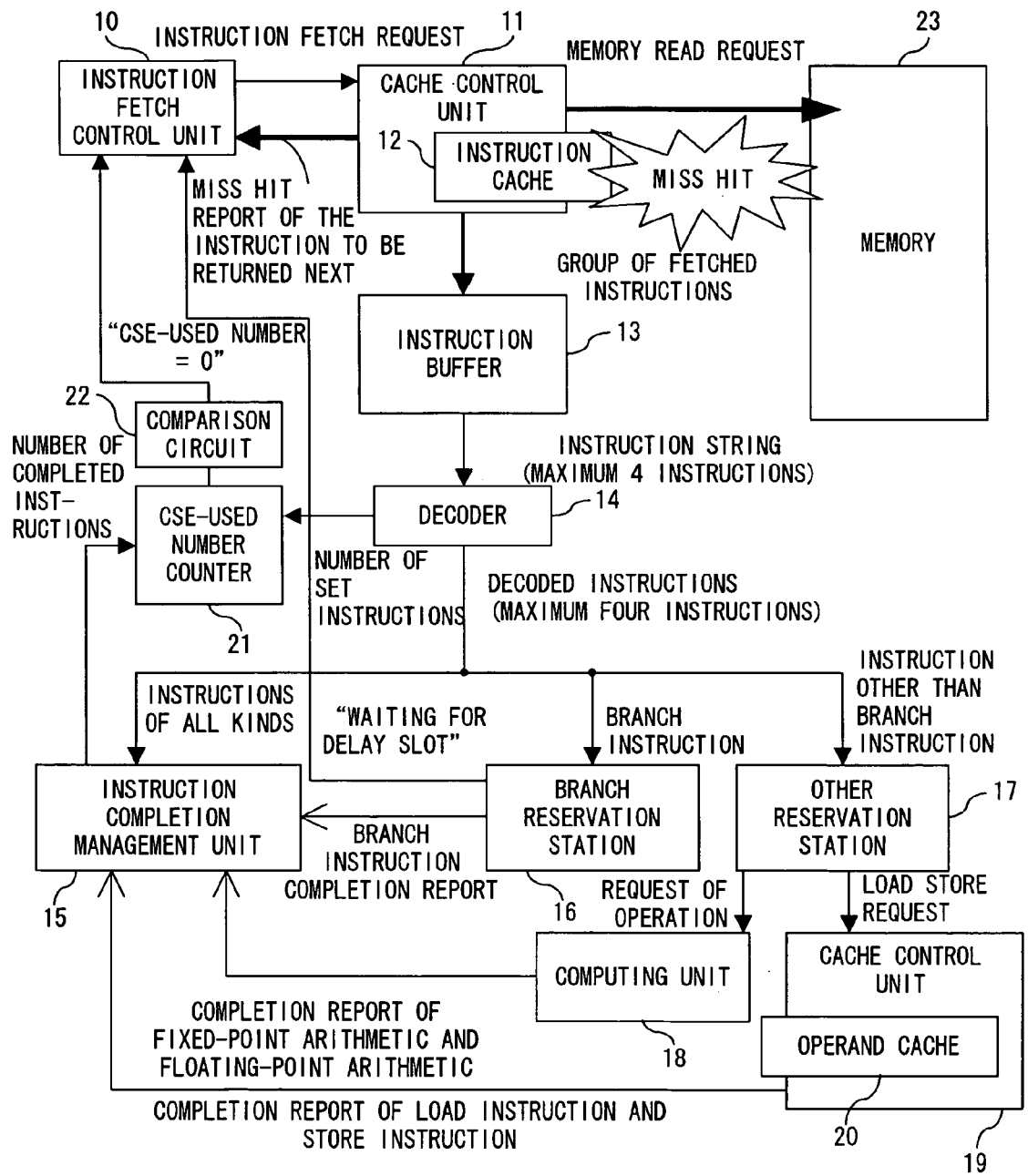
FIG. 2B is a block diagram showing the basic configuration of the information processing device embodying the present invention.

FIG. 2B is a block diagram showing an overall configuration of the information processing device in which the thread switching control method embodying the present invention is used. However, the parts in the information processing device which have nothing to do with the description of the present invention are omitted.

In FIG. 2B, the information processing device comprises an instruction fetch control unit 10 fetching an instruction to be executed, a cache control unit 11 receiving an instruction fetch request from the instruction fetch control unit 10 and retrieving the instruction stored in an instruction cache 12, an instruction buffer 13 temporarily storing a group of fetched instructions outputted by the cache control unit 11, a decoder 14 decoding an instruction in an instruction string stored in the instruction buffer 13, an instruction completion management unit 15 managing all the decoded instructions until their execution is completed, a branch reservation station 16 controlling a branch instruction until its execution is completed when the decoded instruction is a branch instruction, another reservation station 17 storing data and managing the execution of the data, related to instructions other than branch instructions, for example, arithmetic instructions a computing unit 18 executing operation in response to an operation request from, for example, a reservation station for computing instructions, a cache control unit 19 retrieving the contents of an operand cache 20 in response to the request of a load or storing from the other reservation station 17 managing a load instruction, a storing instruction, etc., a counter 21 counting the number of instructions which are set in the entry (commit stack entry: CSE) in the instruction completion management unit 15 by the decoder 14 and the number used for CSE based on of the number of completed instructions reported from the instruction completion management unit 15, a comparison circuit 22 detecting that the number used, for example, for CSE is 0 based on of the output of the counter 21, a memory 23 receiving a memory read request from the cache control unit 11 when an instruction to be fetched does not exist in the instruction cache 12 and a cache miss occurs.

The thread switching control device of the present invention basically comprises the CSE-used number counter 21, the comparison circuit 22, and a switching request production circuit provided in, for example, the instruction fetch control unit 10 which are shown in FIG. 2B.

In FIG. 2B, when the instruction in which a fetch request is made from the instruction fetch control unit 10 does not exist in the instruction cache 12, a miss hit report for the instruction to be returned next entry is made from the cache control unit 11 to the instruction fetch control unit 10, and a memory read request is outputted to the memory 23.

A maximum of four instructions among an instruction string which is temporarily stored in the instruction buffer 13 are given to the decoder 14 at a time, and a maximum of four instructions are decoded at a time by the decoder 14, and, for example, data related to all the instructions is given to the instruction completion management unit 15.

Every time a branch instruction is completed, a branch instruction completion report is given from the branch reservation station 16 to the instruction completion management unit 15; a completion report of, for example, fixed-point arithmetic and floating-point arithmetic is given from the computing unit 18 to the instruction completion management unit 15; and a completion report of a load instruction or a storing instruction is given from the cache control unit 19 to the instruction completion management unit 15.

A report, for example, indicating that the number used for CSE is 0 is given from the comparison circuit 22 to the instruction fetch control unit 10 as described above. In addition, a signal indicating the waiting of a delay slot is inputted depend on need from the branch reservation station 16 to the instruction fetch control unit 10. The waiting of a delay slot indicates a fetch waiting state of the delay slot instruction when a miss hit of an instruction cache is detected in response to the delay slot instruction, while a delay slot instruction (delay instruction) is in response to a branch instruction, as will be described hereinafter.

Described below is the operation of the instruction completion management unit 15 shown in FIG. 2B which plays an important role to control the thread switching in the embodiment of the present invention with reference to FIG. 3. In FIG. 3, a commit stack entry (CSE) is made in the instruction completion management unit 15 in response to each of the instructions decoded by the decoder 14, as described in FIG. 2B. The setting of this entry and the deletion of this entry according to the completion of an instruction are executed in order. Since a maximum of four instructions are simultaneously decoded by the decoder 14, a maximum of four instructions are simultaneously set to four entries, i.e. CSEs, and an entry which respond to the decoded instruction in each reservation station, for example, the other reservation station 17 is made.

If the total number of CSEs, i.e. entries in the instruction completion management unit 15 is set to 64, 64 entries make a continuous image in a circle as shown in FIG. 3. A new entry is made after the entry in which data has already been stored, and one entry after another is deleted in the order from top to end every time an instruction is completed. The position in which an entry should be made next and the position in which an entry should be deleted next are indicated respectively by a pointer. The number of CSEs which are being used now is counted by a CSE-used number counter 21. A signal indicating the number N of instructions have been simultaneously set in a cycle of D release is inputted to the counter 21 from the decoder 14, and a signal indicating the number of M of instructions which have been completed is inputted to the counter 21 from the instruction completion management unit 15.

Next, described below is a first embodiment of the present invention with reference to FIGS. 4 to 7. In this first embodiment, at the point of time when it is reported from the comparison circuit 22 that the number of entries, i.e. CSEs used in the instruction completion management unit 15 is 0, a thread switching request signal is given to the register and program counter required for thread control from the instruction fetch control unit 10, as described in FIG. 2B. This first embodiment corresponds to the case in which a cache miss occurs in response to, for example, a top instruction among instructions which are simultaneously decoded by the decoder 14.

Figure 4:
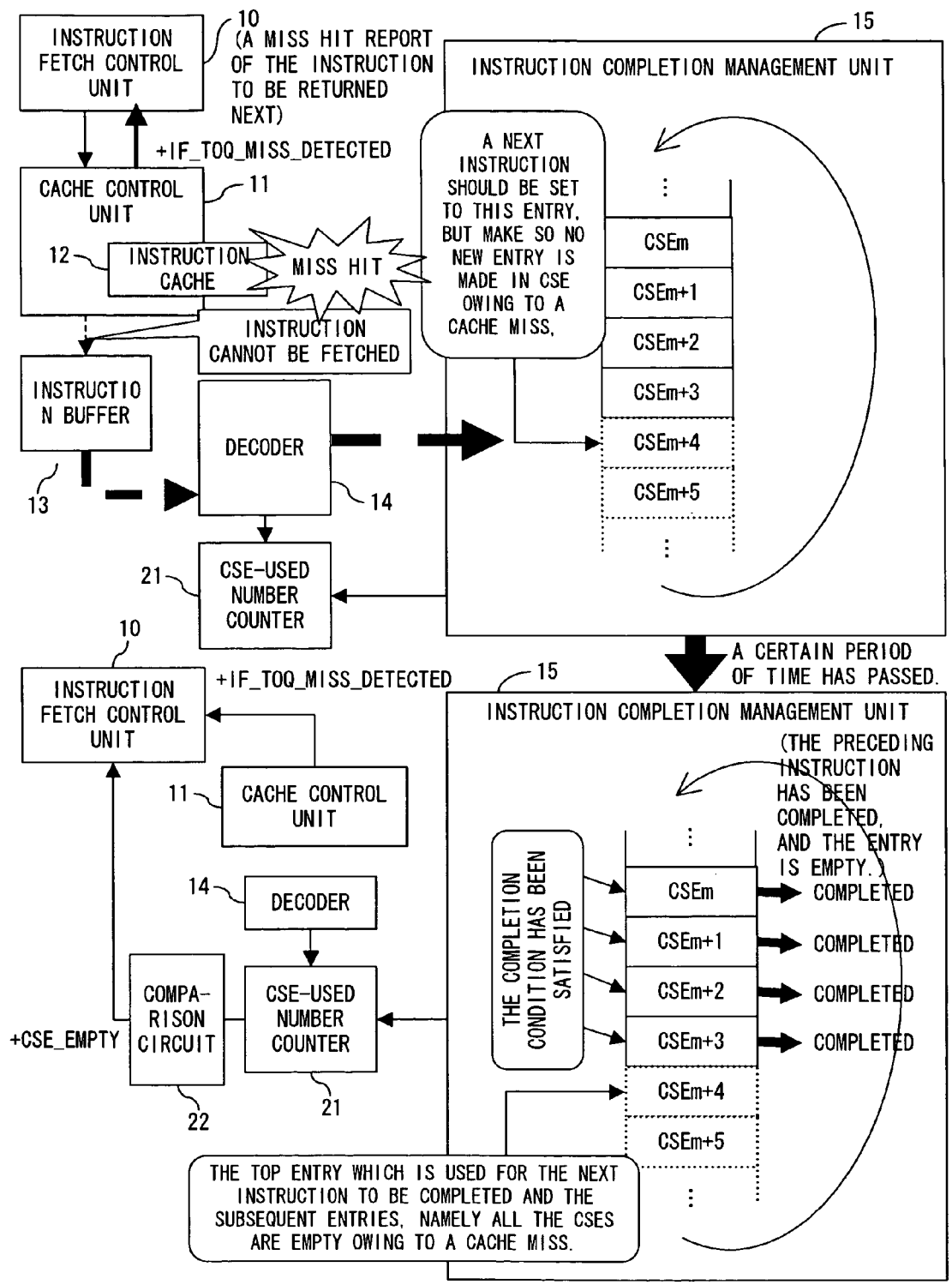
FIG. 4 shows the method of detecting a thread switching condition in a first embodiment.

FIG. 4 shows the state of each entry in the instruction completion management unit 15 when a cache miss occurs to the top instruction. The upper half of FIG. 4 shows that data is stored for the entries from CSEm to CSEm+3 as the entries which have already been made as the result of fetching and decoding the preceding instructions; then, at the point of time when four succeeding instructions are fetched, a cache miss occurs to the top instruction; and since the instructions cannot be fetched, new entries, i.e. CSEm+4 and onward cannot be made in the instruction completion management unit 15.

The lower half of FIG. 4 shows the state after a certain period of time has passed from the state of the upper half. The completion conditions for all the instructions whose data is stored in the entries from CSEm to CSEm+3 are judged to have been satisfied, and these four entries are deleted. However, the next CSEm+4 and subsequent entries have not been made as described above, and all the entries have become empty, so the comparison circuit 22 gives a CSE_EMPTY signal indicating that all the entries are empty, as H (High) to the instruction fetch control unit 10. At that time, a IF_TOQ_MISS_DETECTED signal indicating that a cache miss has occurred, and the data has not been read from the memory 23 yet is given as H (High) to the instruction fetch control unit 10 from the cache control unit 11.

FIG. 5 shows the operation of the comparison circuit 22 shown in FIG. 4. In FIG. 5, a signal, +N, indicating the number N of instructions, i.e. (a maximum is four) which have been set is inputted from the decoder 14 to the CSE-used number counter 21, and a signal, −M, indicating the number M of instructions, i.e. (a maximum is four) which have been completed is inputted from the instruction completion management unit 15 to the CSE-used number counter 21, and the counter 21 adds the number of set instruction, N, and subtracts the number of completed instruction M, to and from the present count value and gives the count value obtained thereby to the comparison circuit 22. When the count value of the CSE-used number counter 21 is 0, the comparison circuit 22 gives the CSE_EMPTY signal as H (High) to the instruction fetch control unit 10 of FIG. 4.

Figure 6:
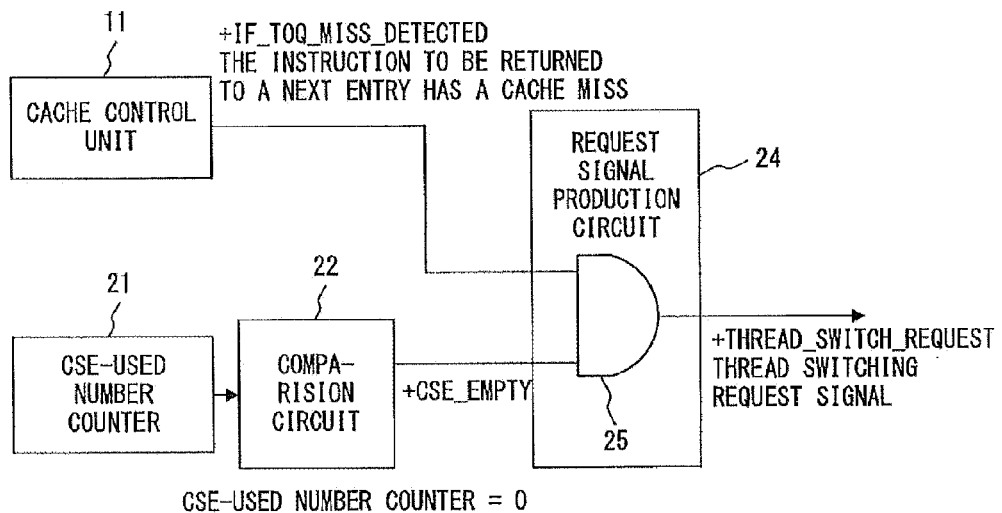
FIG. 6 shows the operation of a circuit which produces a thread switching request signal in a first embodiment.

FIG. 6 shows the operation of a thread switching request production circuit provided in the instruction fetch control unit 10. The thread switching request production circuit 24 substantially comprises one AND gate 25, the AND gate 25 inputs a IF_TOQ_MISS_DETECTED signal indicating that the instruction to be returned next having a cache miss as H from the cache control unit 11, and a CSEEMPTY signal indicating that the value of the CSE-used number counter 21 is 0 as H from the comparison circuit 22, and outputs a THREAD_SWITCH_REQUEST signal indicating a thread switching request, when the two signals are inputted, as H to, for example, various kinds of registers and program counters.

Figure 7:
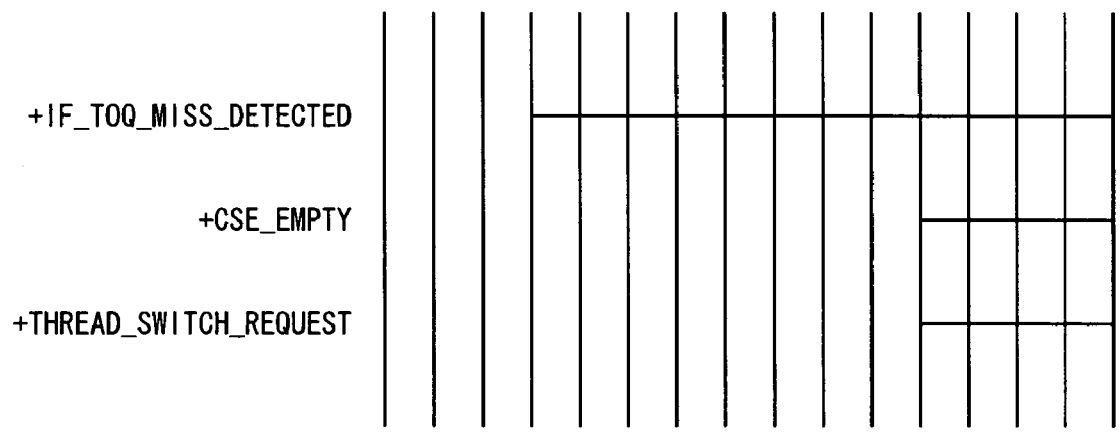
FIG. 7 is a time chart showing the production of a thread switching request signal shown in FIG. 6.

FIG. 7 is a time chart up to the output of a thread switching request signal in the thread switching request production circuit shown in FIG. 6. In FIG. 7, the IF_TOQ_MISS_DETECTED signal from the cache control unit 11 of FIG. 2B becomes H from the point of time when a cache miss is judged, and at the point of time when the CSE_EMPTY signal indicating all the CSEs are empty is outputted as H from the comparison circuit 22, the THREAD_SWITCH_REQUEST signal indicating a thread switching request becomes H. A case in which a cache miss occurs to the top instruction among a maximum of four instructions to be decoded has been described as an example for a first embodiment of the present invention. The first embodiment is the embodiment for changing over threads at the point of time when the count value of the CSE-used number counter becomes 0, and it is a matter of course that the instruction which gives rise to a cache miss is not limited to the top one.

Described below is a second embodiment of the present invention with reference to FIG. 8 to FIG. 13. In this second embodiment, the instruction to be fetched is a branch instruction, and a delay slot instruction (delay instruction) which corresponds to a branch instruction exists immediately after the branch instruction, and thread switching request is made when a cache miss occurs to the delay slot instruction, as in the SPARC (registered trademark) architecture.

Figure 8:
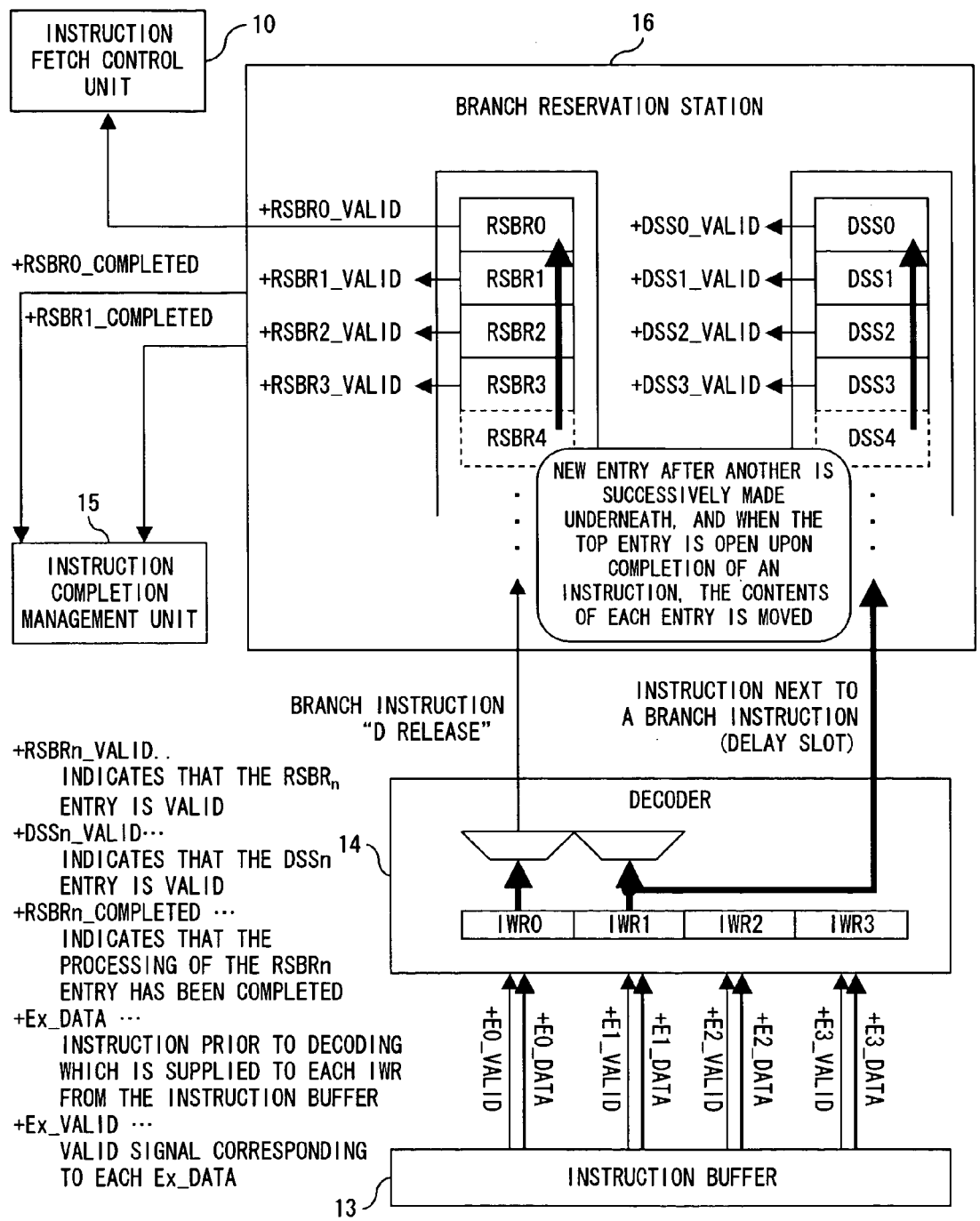
FIG. 8 shows the outline of the operation of the branch reservation station.

In this second embodiment, the branch reservation station 16 as well as the instruction completion management unit 15 play an important role in controlling the thread switching, so described below is the operation of the branch reservation station 16 with reference to FIG. 8. The execution of the branch instruction is completed, plurality of entries of RSBR (reservation station for branch) 0 up to RSBR4 in FIG. 8 are made in the reservation station 16 as the entries in which data corresponding to each of the branch instructions is stored at the point of time when each branch instruction is decoded. New entries are made underneath one after another. The contents of the entry which corresponds to completed branch instruction is deleted, and the contents of each entry is successively moved upward (in a direction of the top entry). The deletion of entries which takes place along with the completion of the execution of a branch instruction is executed in order, so the data related to the oldest branch instruction that has not been completed yet is always stored in the top entry. Whether the data stored in each entry is valid is outputted to outside by a VALID signal. Details of the operation of such a reservation station is described in the following prior application of the applicant.

Patent document 4: Kokai (Jpn. unexamined patent publication) No. 2000-181710 "Branch instruction execution control apparatus"

When a delay slot instruction exists immediately after a branch instruction in response to the branch instruction, the delay slot instruction is set to a delay slot stack (DSS) which stores delay slot instructions without being decoded by the decoder 14. When an instruction is set to the DDS, a VALID signal indicating that that entry is valid is outputted as H to outside.

When a branch instruction has been completed, a COMPLETED signal indicating that the processing of the corresponding entry is completed is outputted as H to the instruction completion management unit 15. How many numbers of completion of branch instructions can be simultaneously reported depends on the way in which branch instructions are entered, however, as described above, at the point of time of this report, the contents of the corresponding entry are deleted, and the contents of each entry are moved upward.

A maximum of four instructions are simultaneously given to the decoder 14 from the instruction buffer 13, the four instructions are given to four respective instruction word registers IWR 0 to IWR 3 respectively. When the instructions are given, the data for the instructions and a valid signal indicating that the data is valid are given as a set.

It is shown in FIG. 8 that as the result of decoding, the instruction of IWR 0 are branch instruction, and data corresponding to the instruction is set in the RSBR in a cycle of D release, and the succeeding instructions immediately after that, i.e. the delay slot instruction stored in the IWR 1 are set to DSS without being decoded. In order to report the completion of a branch instruction to the instruction completion management unit 15, the instruction data must be stored in the entry of the DSS corresponding to the entry in which the data of the branch instruction is stored. If the prediction of the branch has failed, the delay slot instruction is supplied to the instruction word register again from the DSS in which the instruction is stored, and is decoded by the decoder, and then, the delay slot instruction is executed.

Figure 9:
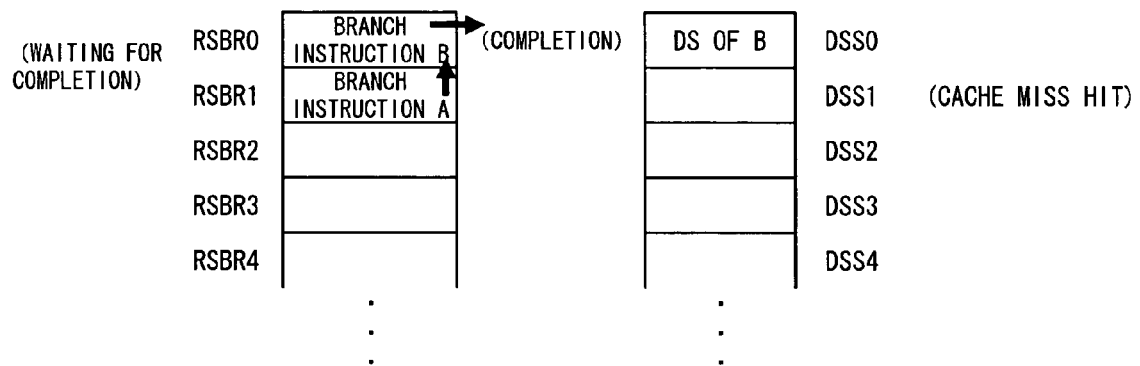
FIG. 9 shows the movement of enties in the branch reservation station.

FIG. 9 shows the movement of an entry in the branch reservation station. In FIG. 9, when a branch instruction which is waiting for completion, i.e. branch instruction B corresponding to RSBR 0 as the top entry has been completed, data for branch instruction A stored in the next RSBR 1 is moved to the upper entry RSBR 0. If the prediction of branch instruction B corresponding to the entry of RSBR 0 has been mistaken, all the entries of RSBR 1 and onward are deleted. The delay slot instruction corresponding to branch instruction B, i.e. the delay slot instruction immediately after branch instruction B is stored in the top entry DSS0 of the delay slot stack.

Figure 10:
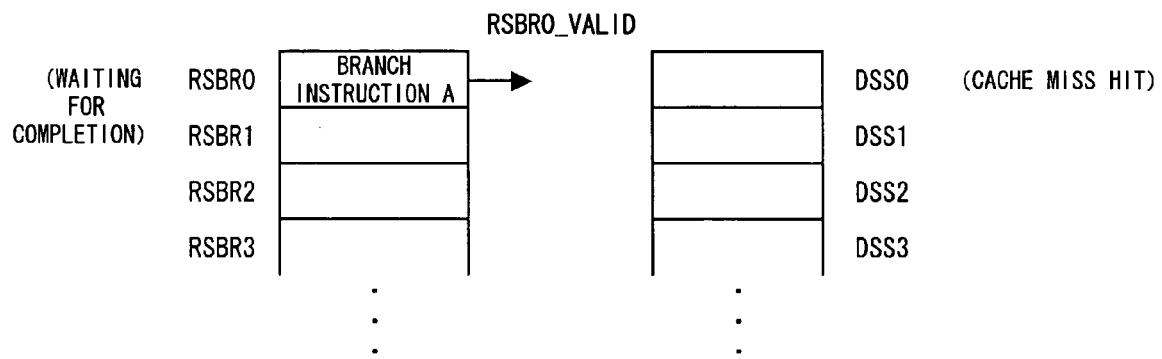
FIG. 10 shows the state of storing the data of delay slot stack when a cache miss to a delay slot instruction in response of a branch instruction is detected.

FIG. 10 shows the contents stored in the RSBR entries and the DSS entries when a cache miss occurs to a delay slot instruction immediately after branch instruction A. When a cache miss hit occurs to a delay slot instruction, no delay slot instruction is stored in the DSS 0 corresponding to the RSBR 0, and a memory read request from the cache control unit 11 of FIG. 2B to memory 23 is made. Here, the processing of branch instruction A cannot be completed because no delay slot instruction is stored in the entry of DSS0, and the VALID signal H responding to the top entry of RSBR remains H. Since instruction fetch is inactive due to a cache miss, the other entries are naturally empty.

Figure 11:
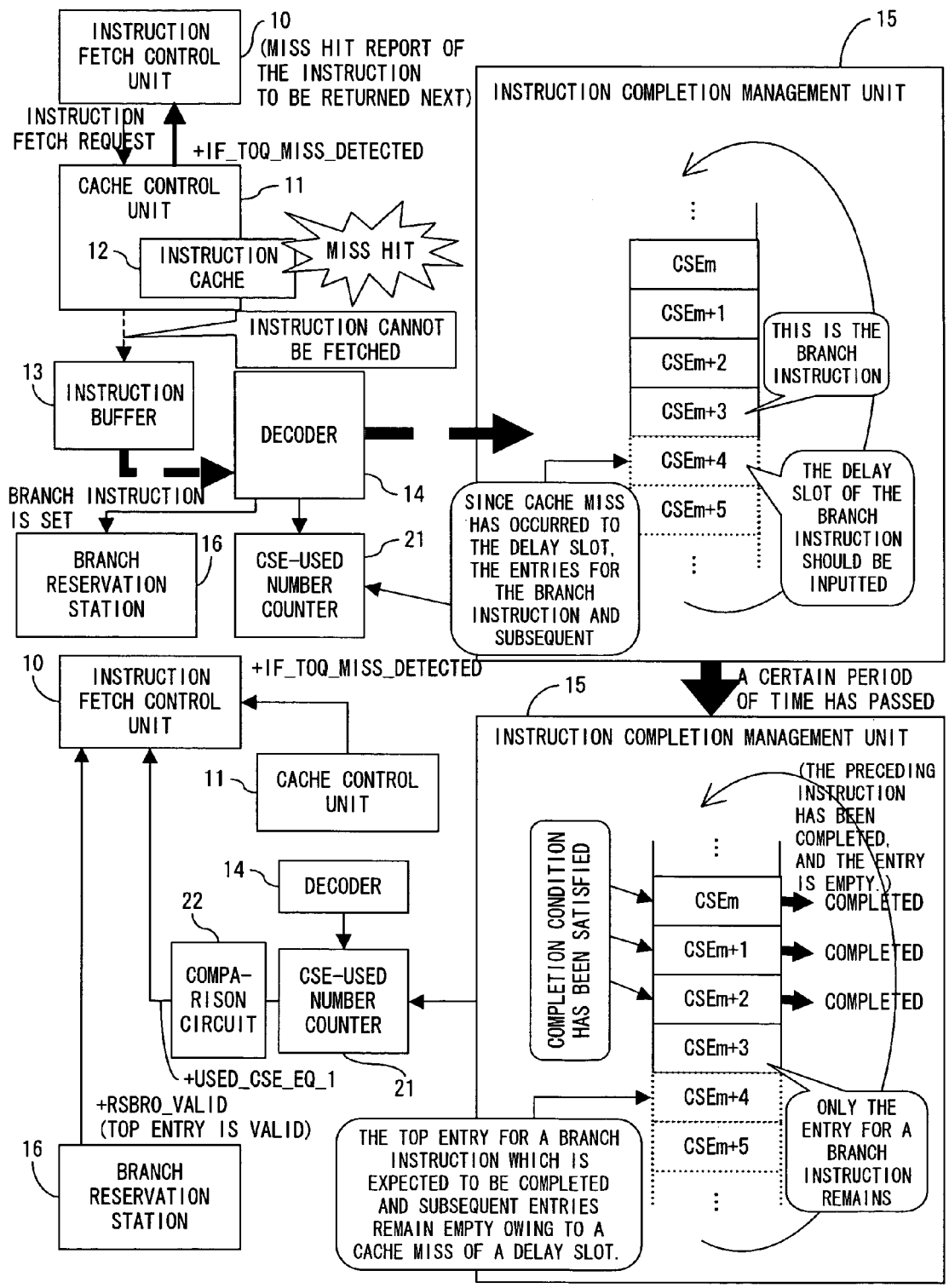
FIG. 11 shows the method of detecting a thread switching condition in a second embodiment.

FIG. 11 shows the state of storing data in the instruction completion management unit in a second embodiment. In the upper half of FIG. 11, when a cache miss occurs to a delay slot instruction immediately after the branch instruction corresponding to entry CSEm+3, The entry of CSEm+4 in which this delay slot instruction should be stored remains empty.

After, a certain period of time passes; completion conditions corresponding to the instructions stored in three entries from CSEm to CSEm+2 are satisfied, as shown in the lower half of FIG. 11; the number of instruction completion is given to the CSE-used number counter 21; and the contents of the three entries are deleted, but since no delay slot instruction is stored in the CSEm+4, the entry next to CSEm+3 corresponding to the branch instruction, the branch instruction cannot be completed, and only the entry of CSEm+3 is not empty. In response to this state, a USED_CSE_EQ_1 signal indicating that the count value of the CSE-used number counter 21 is 1 is given as H from the comparison circuit 22 to the instruction fetch control unit 10, and a RSBR 0_VALID signal indicating that the top entry is valid is given as H from the branch reservation station 16 to the instruction fetch control unit 10.

Figure 12:
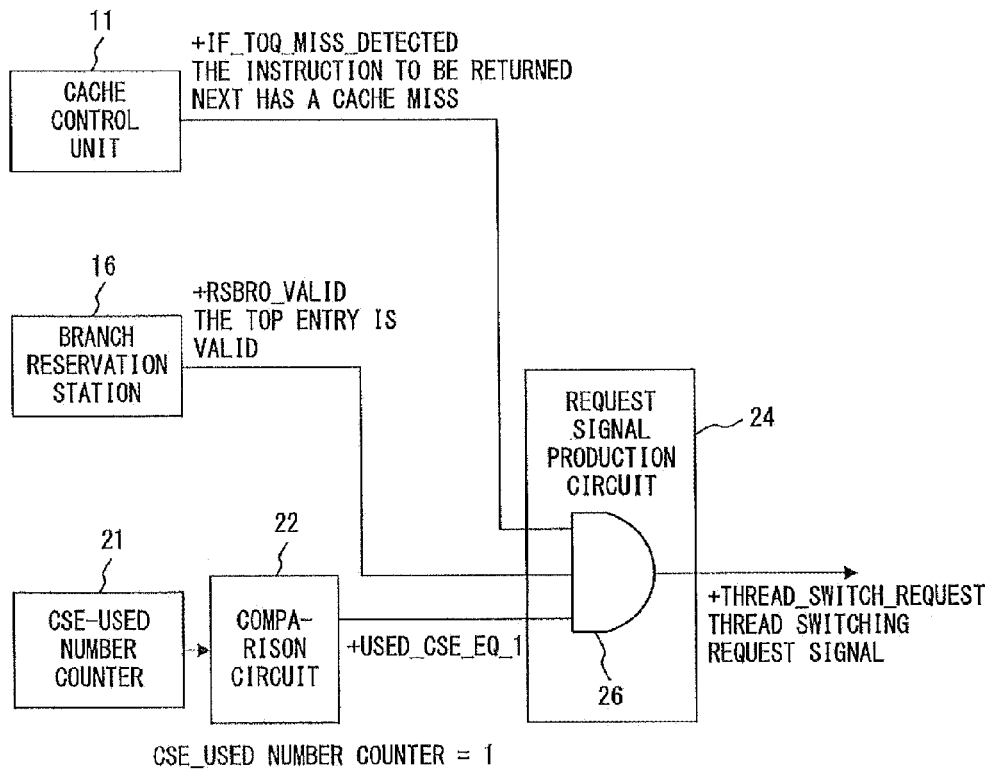
FIG. 12 shows the operation of a circuit which produces a thread switching request signal in a second embodiment.

FIG. 12 shows the operation of a thread switching request production circuit in a second embodiment. In FIG. 12, the request production circuit 24 substantially comprises one AND gate 26. The AND gate 26 inputs a signal indicating that the instruction to be returned next has a cache miss as H from the cache control unit 11 as described in FIG. 6; a signal indicating that the top entry is valid is inputted as H to the AND gate 26 from the branch reservation station 16 as described in FIG. 11, and a signal indicating that the value of the CSE-used number counter 21 is 1 as H from the comparison circuit 22, and outputs a signal indicating a thread switching request. In order to realize the operation in combination with that of a first embodiment, the output of the AND gate 25 shown in FIG. 6 and the output of the AND gate 26 shown in FIG. 12 are made to be inputted to the OR gate, and the output of a OR gate can be made a thread switching request signal.

FIG. 13 is a time chart up to the output of a thread switching request signal in the thread switching request production circuit shown in FIG. 12. In FIG. 13, at the point of time when an entry corresponding to a branch instruction is made, after the RSBR0_VALID signal becomes H, then, a signal indicating that a cache miss has occurred to the delay slot instruction immediately after the branch instruction has become H; after then, at the point of time when a signal indicating that the value of the CSE-used number counter 21 is 1 has become H, the thread switching request signal becomes H.

Unlike a first embodiment, in a second embodiment, the condition that the count value of the CSE-used number counter 21 is 1, and the top entry of the branch reservation station 16 is valid is used, instead of the condition that all the instructions before the instruction which gives rise to a cache miss have been completed, and the value of the CSE-used number counter 21 is 0.

Next, a third embodiment of the present invention is described below. In this third embodiment, a cache miss occurs for the fetch request of a delay slot instruction which exists immediately after a branch instruction, and becomes the opportunity of thread switching, as in a second embodiment. After a cache miss occurs, the data of the delay slot instruction is read from the memory, and when that instruction is given from the instruction buffer to the decoder via the instruction word register, that instruction is supplied, for example, via the instruction word register IWR0 in which the top instruction is given among the four instructions shown in FIG. 8, so only one branch instruction remains uncompleted, and in the case it is detected that a delay slot instruction as a succeeding instruction has not been supplied to the IWR 0, a thread switching request is outputted.

FIG. 14 shows the supply of a branch instruction from the instruction buffer 13 to the decoder 14 when the branch instruction is given from the decoder to the branch reservation station 16 via the IWR3, i.e. the last order in the four instruction word registers. In FIG. 14, if all the instructions from the top to the third are instructions other than branch instructions, those instructions are given to the other reservation station 17 in FIG. 2B, and the branch instruction of the last order supplied via the IWR3 is given to the branch reservation station 16. Since a delay slot instruction is the instruction immediately after the branch instruction, the supply of the delay slot instruction is not shown in FIG. 14, and the delay slot instruction should be supplied in the following cycle to the decoder 14 via the IWR0 from the instruction buffer 13.

Figure 15:
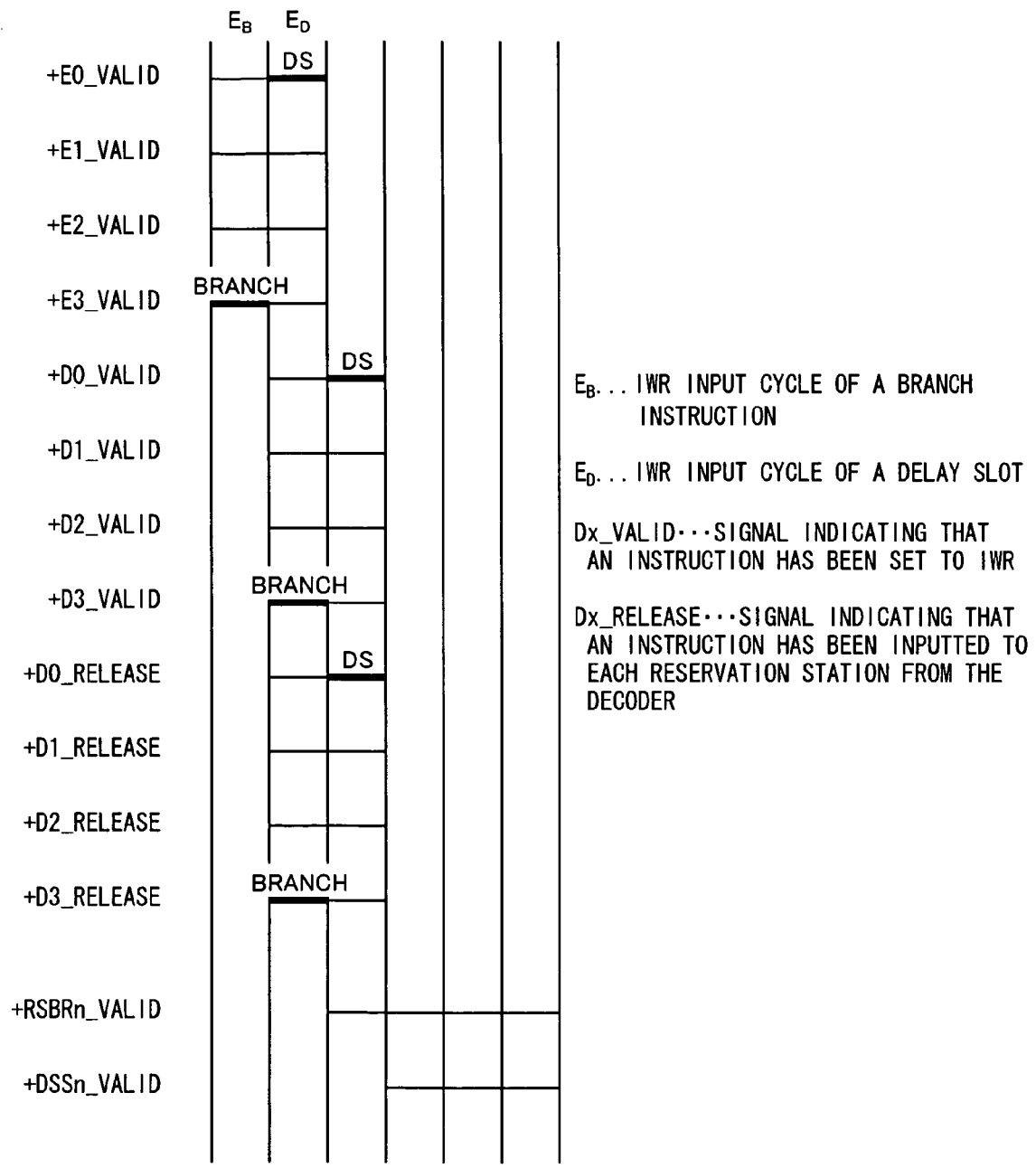
FIG. 15 is a time chart showing the supply of instruction data shown in FIG. 14.

FIG. 15 is a time chart showing the supply of instruction data from the instruction buffer 13 of FIG. 14 via the four instruction word registers. In FIG. 15, $E_D$ indicates the cycle of instruction input of branch instructions to the instruction word register; $E_D$ indicates the cycle of input of a delay slot instruction to the IWR; $E_X\_VALID$ is a signal indicating an instruction to be inputted to the IWR exists in the instruction buffer; $D_X\_VALID$ is a signal indicating that instruction data is set to the IWRx, and the instruction can be supplied to the decoder; and $D_X\_RELEASE$ is a signal indicating that data related to the instruction has been inputted to each reservation station from the decoder.

In FIG. 15, for the fetch request of a delay slot instruction, the delay slot instruction which is hit to the cache and is inputted to IWR 0 in the $E_D$ cycle is given to the decoder 14 in the following cycle, and is stored in the position DSSn to the nth entry RSBRn of the branch reservation station 16 in which data related to the branch instruction immediately before the delay slot instruction, i.e. data related to the branch instruction supplied from IWR 3 is stored, in the delay slot stack in the following cycle.

In other words, a fetch request to the delay slot instruction is hit to the cache in the following cycle in which the branch instruction is supplied to the decoder via IRW 3, and a normal operation is performed, as described in FIG. 14. When a cache miss occurs to the fetch of the delay slot instruction, no delay slot instruction is supplied, naturally, but a read action is taken to the memory 23.

Unlike FIG. 14 and FIG. 15, FIG. 16 shows the operation of supplying instruction data from the instruction buffer when a cache miss occurs to the fetch request of a delay slot instruction, and thread switching request must be carried out.

In FIG. 16, a branch instruction is supplied from IWR2 to the branch reservation station 16 via the decoder, and a delay slot instruction which is the instruction immediately after the branch instruction, i.e. the instruction to be supplied to the decoder via IRW3 becomes a cache miss when the instruction is fetched, and a period up to which data of the delay slot instruction is supplied from the memory 23 in FIG. 2B becomes the target period for which thread switching is requested. When data of the delay slot instruction is supplied to the instruction buffer 13 from the memory 23, as described above, that instruction data is supplied to the decoder via IWR0. In FIG. 16, a branch instruction is supplied to the decoder via IRW2, but the instruction word register which supplies the branch instruction is not limited to IWR2, and the branch instruction can be supplied to the decoder via IWR3, IWR0, or IWR1, as described in FIG. 14. If a cache miss occurs when a delay slot instruction immediately after the branch instruction is fetched, the value of the E0_VALID signal and D0_VALID signal which correspond to the IWR0 to which instruction data read from the memory 23 is supplied continues during the period of L.

FIG. 17 is a time chart showing the supply of instruction data shown in FIG. 16. When the time chart of FIG. 17 is compared with the normal operation shown in FIG. 15, the former differs from the latter in that a branch instruction is supplied to the decoder via IWR2 and that the E0_VALID signal corresponding to the delay slot (DS) instruction does not turn on in the $E_D$ cycle, and the supply of subsequent instruction data is stopped, so that the lowest DSSn_VALID signal does not turn on.

Figure 18:
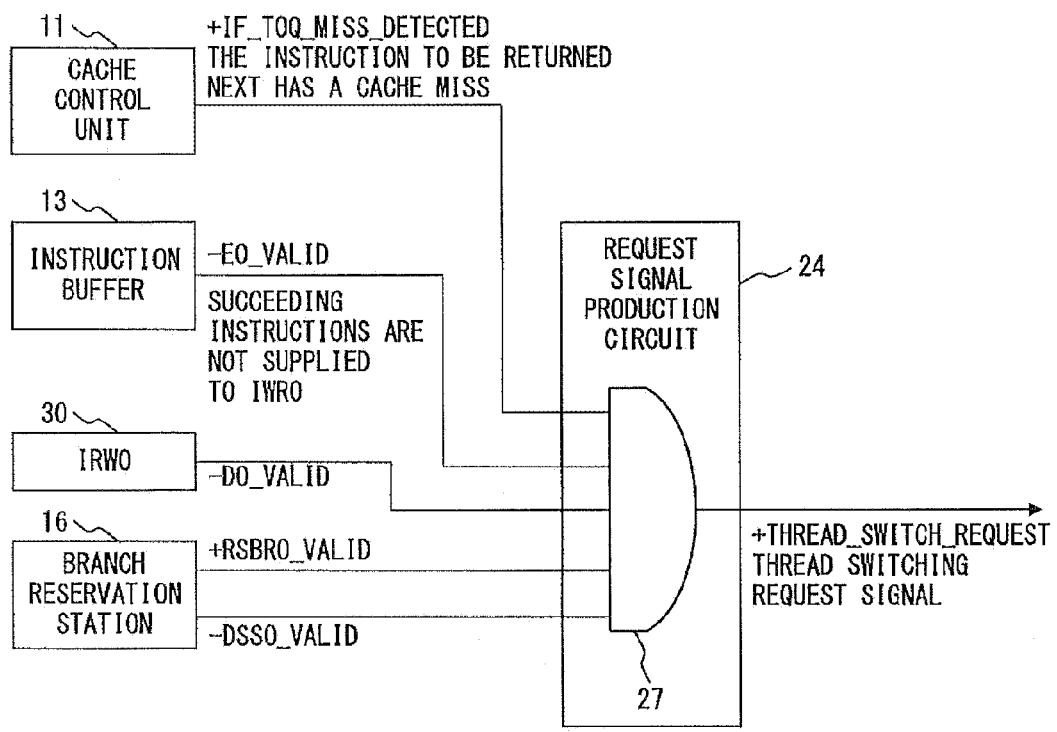
FIG. 18 shows the operation of a circuit which produces a thread switching request signal in a third embodiment.

FIG. 18 shows the operations of the thread switching request signal production circuit in the third embodiment. In the third embodiment, when a delay slot instruction immediately after a branch instruction is fetched, a cache miss occurs, and a thread switching request is outputted for a period during which the data is read from the memory, and is supplied via, for example, the instruction word register IWR0 shown in FIG. 16, so a branch instruction other than a branch instruction immediately before a delay slot instruction needs to have been completed, but the instruction other than the branch instruction does not necessarily need to have been completed, and as compared with, for example, FIG. 12, the condition that the count value of the CSE-used number counter 21 is 1 is not required.

In FIG. 18, at the point of time when a cache miss occurs to the fetch request of the delay slot instruction, the same signal as that shown in FIG. 12 is given to the AND gate 27 which produces a thread switching request signal from the cache control unit 11. Inputted from the branch reservation station 16 are a signal indicating that data in the top entry is valid, a signal indicating that data in the second entry from the top is invalid, and a signal indicating that data in the position of the delay slot stack corresponding to RSBR0 is invalid. Thus, it is made clear that only one branch instruction is stored in the branch reservation station 16, and that no data is stored in the delay slot stack corresponding to the branch instruction.

If a cache miss occurs when a delay slot instruction is fetched, both the E0_VALID signal given from the instruction buffer 13 to IWR0 and the D0_VALID signal given from IWR0 to the decoder remain L for a period required until the instruction data is read from the memory, and a thread switching request signal is outputted by inputting these conditions to the AND gate 27.

FIG. 19 is a time chart a thread switching request signal of operation in the production circuit shown in FIG. 18. In FIG. 19, for the purpose of simplification, both the E0_VALID signal and D0_VALID signal are supposed to be L from the beginning, and the RSBR0_VALID signal is supposed to be H from the beginning.

In FIG. 19, a cache miss occurring to the delay slot instruction is detected in the fourth cycle from the top, and the RSBR1_VALID signal is supposed to be L from the preceding cycle, the THREAD_SWITCH_REQUEST signal that indicates a thread switching request from the cycle in which a cache miss is detected becomes H.

In other words, in the third embodiment, it is not made the thread switching condition that the execution of all the instructions prior to the instruction in which a cache miss occurs has been completed, as is in a first embodiment. Thread switching is implemented, that even though the execution of the instruction, (which is not a branch instruction) other than the branch instruction corresponding to the delay slot instruction which gives rise to a cache miss has not been completed, if the execution of the other instructions has been completed, and the instruction is not fetched again the deletion of the entry explained in FIG. 9 does not occur.

Details of the embodiments of the present invention have been explained above. For example, in the first embodiment, when a thread switching request signal is outputted at the point of time when all the instructions prior to the instruction which gives rise to a cache miss to an instruction fetch request have been completed, if the time is long which is required until it is detected that the execution of all the instructions prior to the instruction in which a cache miss is detected has been completed, it can be considered that the instruction data read from the memory can be supplied immediately after a thread switching request signal is outputted and thread switching is actually implemented. In such a case as this, since little effect of performance improvement can be expected, it is better to deter the thread switching.

Figure 20:
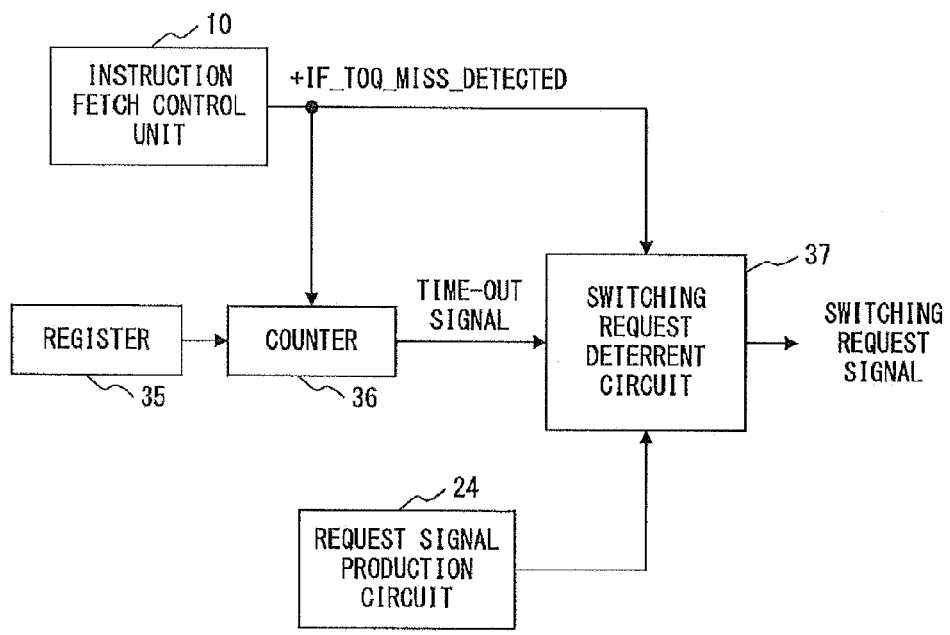
FIG. 20 shows the method of deterring the switching of a thread.

FIG. 20 shows the method of deterring thread switching. In FIG. 20, the uppermost value of the time required to deter thread switching after a cache miss is detected is set to the register 35, and the uppermost value is given to the counter 36. The counter 36 begins counting down at the point of time when a cache miss detection signal given from the cache control unit 11, i.e., a IF_TOQ_MISS_DETECTED signal becomes H, and outputs a time-out signal to the switching request deterrent circuit 37 at the point of time when the count value becomes 0. After the time-out signal is inputted to the switching request deterrent circuit 37, the switching request deterrent circuit 37 deters a switching request from, for example, the switching request production circuit 24 described in FIG. 6. A cache miss detection signal from the cache control unit 11 becomes L at the point of time when actual instruction data arrives from, for example, the memory 23, and switching requests are deterred at and after that point of time. During the period in which switching requests are not deterred, the output of the thread switching request signal production circuit 24 is given to the state register which relate to the thread switching or the program counter etc., via the switching request deterrent circuit 37.

The embodiments of the present invention have been described above using, basically, the method of changing over threads when a cache miss occurs to the instruction which is requested to be fetched, namely the VMT method. However, the method of the present invention are not limited to the VMT method, but are also used for the SMT method. In the SMT method, since the instructions of a plurality of threads are simultaneously flowing through the pipeline, thread switching condition judgement is performed for each of the threads in which an instruction string (a tag indicating a thread is attached) in which a cache miss has occurred is executed as in the first embodiment to the third embodiment, and if the thread switching conditions are satisfied, the instruction string of the thread in which a cache miss has occurred, i.e. the instruction string of the thread other than the thread which is waiting for data is preferentially inputted to the pipeline and operation processing is made to be performed for said instruction string, thereby causing the performance of the multi-threading method to be improved.

Also described above is the embodiment of the present invention in which when a cache miss occurs, instruction data which does not exist in the cache is read from the memory. When the cache has a plurality of hierarchies, the next cache in the hierarchy far from the CPU is accessed and data is read. In this case, when the time required to access the next hierarchy is long enough, and the time can be effectively used for thread switching, the improvement of the performance can be realized by implementing the thread switching. In a cache system having a plurality of hierarchies, when a cache miss occurs in, for example, a transitional hierarchy, a miss hit report to the instruction fetch control unit 10 shown in FIG. 2B may be sent directly from the hierarchy in which the cache miss occurs, or may be sent from the cache of the hierarchy which is the closest to the CPU via each hierarchy.

Also describes above is the thread switching to be implemented on the opportunity when the memory is accessed owing to a miss of an instruction cache, and a next hierarchy is accessed owing to a cache miss occurring to a hierarchy in the cache of a plurality of hierarchies. However, the opportunity of thread switching is not limited to the above opportunity, but it is also possible, naturally, to control the thread switching on other conditions such as an operand cache miss or on the basis of a combination of a plurality of conditions.

What is claimed is:

1. A processor, executing a plurality of threads, each of the plurality threads having a plurality of instructions, comprising:
    an instruction cache unit that stores instructions of a thread of the plurality of threads;
    an instruction fetch unit that fetches an instruction of the thread from the instruction cache unit;
    a cache control unit that detects a cache miss occurring due to an instruction to be fetched by the instruction fetch unit is not stored in the instruction cache unit;
    an instruction decode unit that decodes the fetched instruction;
    an instruction execution unit that executes the decoded instruction of the thread;
    an instruction completion management unit that includes a plurality of entries, each of the entries is created and stores data related to the decoded instruction in order of decoding, and deletes the created entry corresponding to the executed instruction in order of executing when the executed instruction is completed by the instruction execution unit;
    an uncompleted instruction number report unit that reports a number of uncompleted instructions in response to a number of the entries in the instruction completion management unit; and
    a thread switching control unit that controls the instruction fetch unit to switch from the thread to another thread of the plurality of threads when the reported number of uncompleted instructions indicates 0 and the cache control units detects the cache miss.

2. The processor according to claim 1, further comprising: a thread switching deterrent unit that deters a control for switching from the thread to another thread of the plurality of threads by the thread switching control unit when the thread switching control unit does not control the instruction fetch unit to switch the thread output a request signal within a specific time determined in advance starting from the cache miss occurrence.

3. A processor, executing a plurality of threads, each of the plurality threads having a plurality of instructions, comprising:
    an instruction cache unit that stores instructions of a thread of the plurality of threads;
    an instruction fetch unit that fetches an instruction from the instruction cache unit;
    a cache control unit that detects a cache miss occurring due to an instruction to be fetched by the instruction fetch unit is not stored in the instruction cache unit;
    an instruction decode unit that decodes the fetched instruction;
    an instruction execution unit that executes the decoded instruction of the thread;
    an instruction completion management unit that includes a plurality of first entries, each of the first entries is created and stores data related to the decoded instruction in order of decoding, and deletes the created first entry corresponding to the executed instruction in order of executing when the executed instruction is completed by the instruction execution unit;

an uncompleted instruction number report unit that reports a number of uncompleted instructions in response to a number of the first entries;

a branch reservation station that includes a plurality of second entries and delay slot stacks, each of the second entries is created and stores valid information related to a branch instruction included in the thread decoded by the instruction decode unit in order of decoding, each of the delay slot stacks stores a delay instruction in response to one entry of the second entries in which data is related to the decoded branch instruction when the delay instruction corresponding to the branch instruction exists immediately after the branch instruction, deletes one of the second entries corresponding to the branch instruction in order of executing when the executed branch instruction is completed by the instruction execution unit, and moves the second entries corresponding to uncompleted branch instructions successively toward a top entry of the second entries; and a thread switching control unit that controls the instruction fetch unit to switch from the thread to another thread of the plurality of threads when the reported number of uncompleted instructions indicates 1, the data stored in the top entry of the second entries of the branch reservation station is valid and the cache control units detects the cache miss.

4. The processor according to claim 3, further comprising:

an instruction buffer that stores one or more fetched instructions one by one and that outputs a valid signal indicating that data stored is valid; and a plurality of instruction word registers that store one or more fetched instructions from the instruction buffer one by one and that output a valid signal indicating that the stored instruction is valid, and wherein the thread switching control unit controls the instruction fetch unit to switch the thread when the thread switching control unit receives a signal indicating that data of the top entry of the second entries is valid and that data in a second entry from the top entry of the second entries is invalid, and that data of the delay slot stack responding to the top entry of the second entries is after the cache miss occurs, a signal indicating that an instruction to be outputted from the instruction word register in which an earliest instruction in an order of execution should be stored in the plurality of instruction word registers is invalid, and a signal indicating that an instruction to be outputted from the instruction buffer to the instruction word register is invalid.

5. A processor, executing a plurality of threads, each of the plurality threads having a plurality of instructions, comprising:

an instruction cache unit that stores instructions of a thread of the plurality of threads;

an instruction fetch unit that fetches an instruction from the instruction cache unit;

a cache control unit that detects a cache miss occurring due to an instruction to be fetched by the instruction fetch unit is not stored in the cache memory;

an instruction decode unit that decodes the fetched instruction;

an instruction execution unit that executes the decoded instruction of the thread;

an instruction completion management unit that includes a plurality of entries, each of the entries is created and stores data related to the decoded instruction in order of decoding, and deletes the created entry corresponding to the executed instruction in order of executing when the executed instruction is completed by the instruction execution unit;

an uncompleted instruction number report unit that reports a number of uncompleted instructions in response to a number of the entries in the instruction completion management unit; and a priority order change control unit that controls the instruction fetch unit to change a thread execution priority order when the reported number of uncompleted instructions indicates 0 and the cache control units detects the cache miss.

6. The processor according to claim 5 further comprising:

an instruction buffer that stores one or more fetched instructions one by one and that outputs a valid signal indicating that data stored is valid; and a plurality of instruction word registers that store one or more fetched instructions from the instruction buffer one by one and that output a valid signal indicating that the stored instruction is valid, wherein the priority order change control unit controls the instruction fetch unit to change the thread execution priority order when the priority order control unit receives a signal indicating that data of a top entry of the second entries is valid and that data in a second entry from the top entry of the second entries is invalid, and that data of a delay slot stack responding to the top entry of the second entries is invalid, after a cache miss occurs, a signal indicating that an instruction to be outputted from the instruction word register in which an earliest instruction in an order of execution should be stored in a plurality of instruction word registers is invalid, and a signal indicating that an instruction to be outputted from the instruction buffer to the instruction word register is invalid.

7. The processor according to claim 5, further comprising:

a thread priority order change deterrent unit that deters a control for changing the thread priority order by the priority order change control is started when the cache miss occurs and that stops to output the thread priority order change request signal when the thread priority order change control unit does not control the instruction fetch unit to change the thread priority order output a request signal within a specific time determined in advance starting from the cache miss occurrence.

8. A processor, executing a plurality of threads, each of the plurality threads having a plurality of instructions, comprising:

an instruction cache unit that stores instructions of a thread of the plurality of threads;

an instruction fetch unit that fetches an instruction from the instruction cache unit;

a cache control unit that detects a cache miss occurring due to an instruction to be fetched by the instruction fetch unit is not stored in the cache memory;

an instruction decode unit that decodes the fetched instruction;

an instruction execution unit that executes the decoded instruction of the thread;

an instruction completion management unit that includes a plurality of first entries, each of the first entries is created and stores data related to the decoded instruction in order of decoding, and deletes the created first entry corresponding to the executed instruction in order of executing when the executed instruction is completed by the instruction execution unit.

an uncompleted instruction number report unit that reports a number of uncompleted instructions in response to a number of the first entries;

a branch reservation station that includes a plurality of second entries and delay slot stacks, each of the second entries is created and stores valid information related to a branch instruction included in the thread decoded by the instruction decode unit in order of decoding, each of the delay slot stacks stores a delay instruction in response to one entry of the second entries in which data is related to the decoded branch instruction when the delay instruction corresponding to the branch instruction exists immediately after the branch instruction, deletes one of the second entries corresponding to the branch instruction in order of executing when the executed branch instruction is completed by the instruction execution unit, and moves the second entries corresponding to uncompleted branch instructions successively toward a top entry of the second entries; and a priority order change control unit that controls the instruction fetch unit to change a thread execution priority order when the reported number of uncompleted instructions indicates 1, the data stored in the top entry of the second entries of the branch reservation station is valid and the cache control unit detects the cache miss.

9. A thread switching method for a processor, executing a plurality of threads, each of the plurality threads having a plurality of instructions, including an instruction cache unit storing instructions of a thread of the plurality of threads comprising:

fetching an instruction of the thread from the instruction cache unit;

detecting a cache miss occurring due to an instruction to be fetch at the fetching is not stored in the instruction cache unit;

decoding the fetched instruction executing the decoded instruction of the thread;

creating a plurality of entries in an instruction completion management unit, each of the entries stores data related to the decoded instruction in order of decoding;

deleting the created entry corresponding to the executed instruction in order of the executing when the executed instruction is completed;

reporting a number of uncompleted instructions in response to a number of the entries; and switching from the thread to another thread of the plurality of threads when the reported number of uncompleted instructions indicates 0 and the cache miss is detected at the detecting.

10. A thread execution priority order change method for a processor, executing a plurality of threads, each of the plurality threads having a plurality of instructions, including an instruction cache unit storing instructions of a thread of the plurality of threads comprising:

fetching an instruction of the thread from the instruction cache unit;

detecting a cache miss occurring due to an instruction to be fetch at the fetching is not stored in the cache memory;

decoding the fetched instruction;

executing, the decoded instruction of the thread;

creating a plurality of entries in an instruction completion management unit, each of the entries stores data related to the decoded instruction in order of decoding;

deleting the created entry corresponding to the executed instruction in order of the executing when the executed instruction is completed;

reporting a number of uncompleted instructions in response to a number of the entries; and changing a thread execution priority order when the reported number of uncompleted instructions indicates 0 and the cache miss is detected at the detecting.

* * * * *

UNITED STATES PATENT AND TRADEMARK OFFICE
CERTIFICATE OF CORRECTION

| | | |
|---|---|---|
| PATENT NO. | : 8,108,859 B2 | Page 1 of 1 |
| APPLICATION NO. | : 10/967235 | |
| DATED | : January 31, 2012 | |
| INVENTOR(S) | : Megumi Yokoi et al. | |

It is certified that error appears in the above-identified patent and that said Letters Patent is hereby corrected as shown below:

Column 14, Line 38, In Claim 1, delete "units" and insert -- unit --, therefor.

Column 15, Line 26, In Claim 3, delete "units" and insert -- unit --, therefor.

Column 16, Line 12, In Claim 5, delete "units" and insert -- unit --, therefor.

Column 16, Line 60 - Line 67, Claim 8, delete

"an instruction completion management unit that includes a
   plurality of first entries, each of the first entries is created
   and stores data related to the decoded instruction in
   order of
decoding, and deletes the created first entry corresponding
   to the executed instruction in order of executing when
   the executed instruction is completed by the instruction
   execution unit." and insert -- an instruction completion management unit that includes a
   plurality of first entries, each of the first entries is created
   and stores data related to the decoded instruction in
   order of decoding, and deletes the created first entry corresponding
   to the executed instruction in order of executing when
   the executed instruction is completed by the instruction
   execution unit; --, therefor.

Column 17, Line 37, In Claim 9, delete "instruction" and insert -- instruction; --, therefor.

Signed and Sealed this
Tenth Day of April, 2012

David J. Kappos
*Director of the United States Patent and Trademark Office*